(81.)
JOHN W. HICKS.
Belt Fasteners.
No. 121,781.                              Patented Dec. 12, 1871.

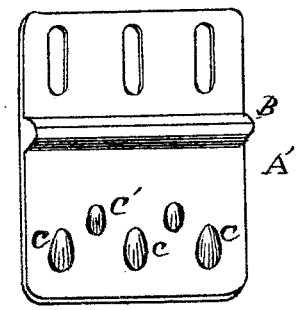

Witnesses
W. C. Raymond
John G. Trine
Inventor
John W. Hicks
By his Atty.
Daniel Breed

UNITED STATES PATENT OFFICE.

JOHN W. HICKS, OF LAUREL, MARYLAND.

IMPROVEMENT IN BELT-FASTENINGS.

Specification forming part of Letters Patent No. 121,781, dated December 12, 1871.

*To all whom it may concern:*

Be it known that I, JOHN W. HICKS, of Laurel, in the State of Maryland, have invented certain new and useful Improvements in Clamps or Clasps for Fastening Belts, of which the following is a specification:

My invention consists of a peculiar novel construction of self-tightening clamp or clasp for connecting two ends of a belt.

Figure 1:
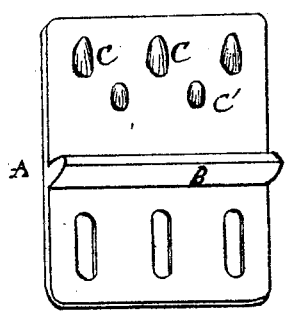
Figure 2:
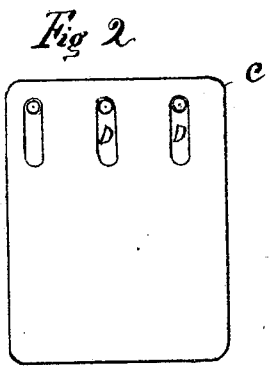
Figure 3:
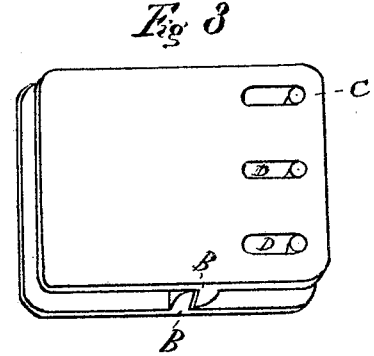

In the accompanying drawing, Figure 1 represents the inside of two reversely-corresponding plates, which, being brought together as seen in Figs. 2 and 3, form my improved clamp or clasp. Fig. 2 is a top view of the clasp when locked. Fig. 3 is a perspective view of the clamp, showing the self-tightening lock.

In making my clamp or clasp the two pieces, Fig. 1, are finished exactly alike, with slots D in the plates A A' and an oblique catch, B, for locking the two plates together. Each plate A A' is provided with two sets of teeth, C and C', the longer of which passes through the slots D so as to bear on one end of the slot like the tongue of a buckle. The shorter teeth C' are intended to pass through the belt and thus give additional bearing-surface to prevent the belt from tearing. The number of slots and teeth may be varied without departing from my invention, and the clasp may be made of malleable iron or any other suitable metal. I prefer making the plates A A' crooked, or with a bend across the center near the lock, so the teeth may be driven into the belt and the oblique lock entered, when the plates are hammered down straight.

I claim—

The above-described clamp or clasp, consisting of two plates, A A', provided with the oblique catches B, the teeth C C', and the slots D, substantially as set forth.

JOHN W. HICKS.

Witnesses:
DANIEL BREED,
EDM. F. BROWN.

(81)